United States Patent
Toub et al.

(10) Patent No.: US 10,572,620 B2
(45) Date of Patent: Feb. 25, 2020

(54) CUSTOM PIECEWISE DIGITAL LAYOUT GENERATION

(71) Applicant: Oracle International Corporation, Redwood City, CA (US)

(72) Inventors: David L. Toub, Austin, TX (US); Larry B. Edwards, Sunnyvale, CA (US); Terry L. Maness, Albion, CA (US); Johan Bastiaens, Santa Clara, CA (US)

(73) Assignee: Oracle International Corporation, Redwood Shores, CA (US)

( * ) Notice: Subject to any disclaimer, the term of this patent is extended or adjusted under 35 U.S.C. 154(b) by 86 days.

(21) Appl. No.: 15/667,381

(22) Filed: Aug. 2, 2017

(65) Prior Publication Data
US 2019/0042687 A1 Feb. 7, 2019

(51) Int. Cl.
*G06F 17/50* (2006.01)

(52) U.S. Cl.
CPC ........ *G06F 17/5072* (2013.01); *G06F 17/505* (2013.01); *G06F 17/5081* (2013.01); *G06F 2217/74* (2013.01)

(58) Field of Classification Search
CPC . G06F 17/5072; G06F 17/505; G06F 17/5081
USPC .......... 716/118–119, 122, 123, 139
See application file for complete search history.

(56) References Cited

U.S. PATENT DOCUMENTS

| | | | |
|---|---|---|---|
| 7,240,318 B2 * | 7/2007 | Ito ................ | G06F 17/5068 716/112 |
| 7,345,346 B2 * | 3/2008 | Hoshizaki ...... | H01L 29/41733 257/368 |
| 7,363,607 B2 | 4/2008 | Birch | |
| 7,802,208 B1 | 9/2010 | Waller | |
| 8,667,444 B2 * | 3/2014 | Henrickson ..... | G06F 17/5077 716/122 |
| 9,092,590 B2 * | 7/2015 | Giraud .......... | G06F 17/5068 |
| 9,245,082 B2 | 1/2016 | Birch | |
| 2002/0190327 A1 * | 12/2002 | Grimm .......... | H01L 27/0207 257/365 |
| 2004/0143797 A1 * | 7/2004 | Nguyen ......... | G06F 17/5045 716/122 |
| 2012/0304138 A1 * | 11/2012 | Farooq .......... | G06F 17/5081 716/111 |
| 2013/0219353 A1 * | 8/2013 | Henrickson ..... | G06F 17/5072 716/122 |

(Continued)

*Primary Examiner* — Stacy Whitmore
(74) *Attorney, Agent, or Firm* — Kowert, Hood, Munyon, Rankin & Goetzel, P.C.; Erik A. Heter

(57) ABSTRACT

A method and apparatus for performing custom, piecewise digital layout generation is disclosed. The method comprises selecting, in a schematic of a digital circuit displayed in a digital circuit layout tool, a group of transistors and selecting one of a plurality of rows in a physical layout in which the group of transistors is to be placed. After the group of transistors is selected, the digital circuit layout tool may automatically place transistors of the group of transistors in the one of the plurality of rows of the physical layout. The method further comprises repeating selecting of additional groups of transistors, selecting from the plurality of rows, and automatically placing until all transistors of the digital circuit depicted as in the schematic have been placed for use in generating a physical layout plan for the first digital circuit.

19 Claims, 11 Drawing Sheets

(56) References Cited

U.S. PATENT DOCUMENTS

2015/0100287 A1* 4/2015 Belledent .............. G06F 19/702
                                                                703/2
2015/0363538 A1* 12/2015 Ogawa ................ G06F 17/5036
                                                                716/137
2018/0307791 A1* 10/2018 Mousa ................ G06F 17/5081

* cited by examiner

CUSTOM PIECEWISE DIGITAL LAYOUT GENERATION

BACKGROUND

Technical Field

This disclosure is directed to digital circuits, and more particularly, to the design and layout of digital circuitry in various environments, such as part of a printed circuit assembly (PCA) or on an integrated circuit (IC).

Description of the Related Art

In designing digital circuits, one of the steps in finalizing the design is to perform a layout of the desired circuit. Performing a layout of a desired circuit may be automated using computer implemented circuit layout tools. Using such tools, a designer may generate a plan for a physical layout of digital circuit to be implemented on, e.g., an integrated circuit (IC). Generating a layout for a digital circuit may include generating a pattern for a mask for used in manufacturing the IC.

Circuit tools may specify certain design constraints from which the physical layout flows. Such constraints may include, e.g., sub-unit size, sub-unit location, and specific place and route options for components and interconnections, respectively. Beginning with these constraints, a designer using the circuit layout tool may select among the various options to generate a circuit layout plan that conforms to the design constraints. Generally speaking, these circuit layout tools may be layout-driven, i.e., conforming the circuit to the various options presented by the tools to generate a physical layout.

SUMMARY

A method and apparatus for performing custom, piecewise digital layout generation is disclosed. In one embodiment, a method comprises selecting, in a schematic of a digital circuit displayed in a digital circuit layout tool, a group of transistors and selecting one of a plurality of rows in a physical layout in which the group of transistors is to be placed. After the group of transistors is selected, the digital circuit layout tool may automatically place transistors of the group of transistors in the one of the plurality of rows of the physical layout. The method further comprises repeating selecting of additional groups of transistors, selecting from the plurality of rows, and automatically placing until all transistors of the first digital circuit depicted as in the schematic have been placed for use in generating a physical layout plan for the digital circuit.

In one embodiment, the method further comprises recording various steps used in generating the physical layout plan for the digital circuit. The steps generating the physical layout of the digital circuit may be stored in a database. This may be performed for a number of different digital circuits, thereby generating a library. Thereafter, if a schematic is provided for another digital circuit, the database may be searched for a matching entry. If an entry matches the digital circuit (e.g., an exact match, or a circuit from the family), the placement of transistors may be automatically generated. This may allow rapid layout of complex integrated circuits.

Generally speaking, disclosure contemplates a method for generating a physical layout plan for a digital circuit that is schematic-driven, rather than layout-driven. That is, the method disclosed herein is not limited by the constraints typically associated with prior art solutions for performing digital circuit layout.

BRIEF DESCRIPTION OF THE DRAWINGS

The following detailed description makes reference to the accompanying drawings, which are now briefly described.

Figure 1:
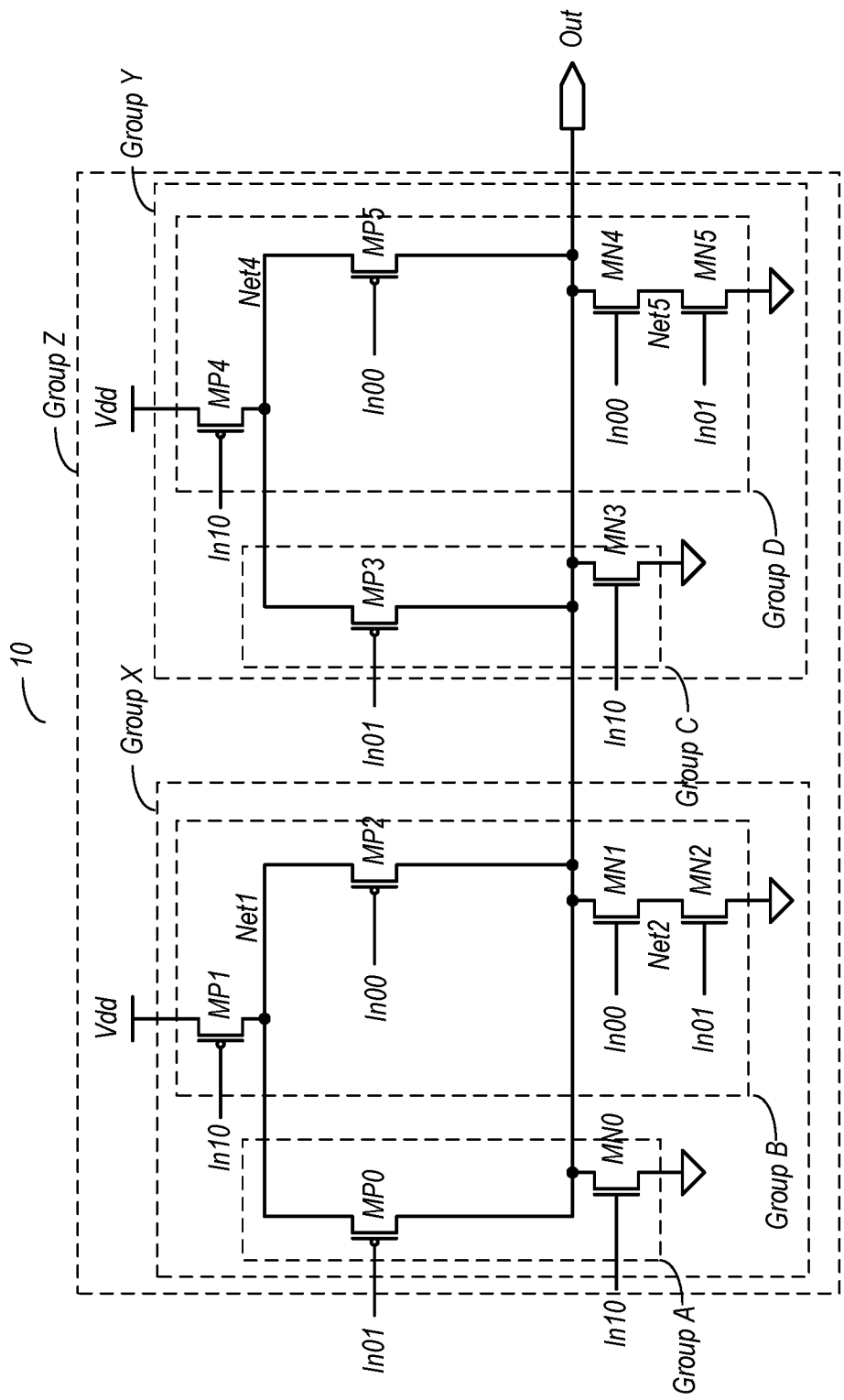
FIG. 1 is a schematic diagram of an exemplary digital circuit embodiment for which a physical layout plan is to be generated.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

In the following description, numerous specific details are set forth to provide a thorough understanding of the disclosed embodiments. One having ordinary skill in the art, however, should recognize that aspects of disclosed embodiments might be practiced without these specific details. In some instances, well-known circuits, structures, signals, computer program instruction, and techniques have not been shown in detail to avoid obscuring the disclosed embodiments.

DETAILED DESCRIPTION OF EMBODIMENTS

Turning now to FIG. 1, a schematic diagram of an exemplary digital circuit embodiment for which a physical layout plan is to be generated is shown. The digital circuit may be implemented on the die of an integrated circuit (IC). The physical layout plan may be generated by a digital circuit layout tool to be discussed herein. The digital circuit layout tool may be a schematic-driven layout tool instead of one focusing on the layout of the digital circuit in terms of various physical design constraints. That is, the generation of a physical layout plan may be performed with a schematic of the circuit being the primary driver, rather than prior art embodiments in which the focus is on the layout itself, separate from the schematic. Thus, the digital circuit layout tool disclosed herein may be capable of generating a physical layout plan of a digital circuit in significantly less time than prior art tools in which a user is primarily focused on the physical layout separate from the information in the schematic.

Circuit 10 as shown in FIG. 1 is one embodiment of an AND-OR-INVERT (AOI) circuit, and includes a number of PMOS and NMOS transistors. The PMOS transistors are designated by "MP" (e.g., MP0) while the NMOS transistors are designated by "MN" (e.g., MN0). In generating a physical layout plan for circuit 10, one of the first steps to be performed may be the grouping of the transistors into various groups. In the example shown in FIG. 1, multiple possible groupings are illustrated. For example, four different groups, Groups A, B, C, and D represent on possible grouping. Group A includes transistors MP0 and MN0, Group B includes transistors MP1, MP2, MN1, and MN2, Group C includes MP3 and MN3, and Group D includes MP4, MP5, MN4, and MN5. Another possible grouping is to use two separate groups, Groups X and Y. Group X in this example includes MP0, MP1, MP2, MN0, MN1, and MN2, while Group Y includes MP3, MP4, MP5, MN3, MN4, and MN5. Yet another possible grouping is to include all transistors into a single group, shown here a Group Z. It is noted that the illustrated groupings are exemplary, and are not intended to be limiting. Generally speaking, for a given digital circuit, a variety of groupings are possible, and the disclosure as presented herein is not intended to limit these groupings in any particular manner.

The digital circuit layout tool may display the schematic, such as the one shown in FIG. 1, in a graphical user interface (GUI) that allows multiple ways to select transistors. Other aspects of the digital circuit layout tool, as discussed below, may also include graphical displays, and may enable a user to perform common GUI-based operations in using the tool. Such operations include cut/paste, drag and drop, and so forth.

A user of the digital circuit layout tool may select the desired groupings based, for example, on a desired optimization. For example, using the grouping having two groups, namely Groups X and Y as shown in FIG. 1, may be well-suited to a symmetrical schematic such as that shown in FIG. 1. Furthermore, such a grouping may optimize net length for the final layout of the circuit. Using the grouping of Groups A, B, C, and D, a user may have more control over the placement of individual devices, and may be more able to optimize input to output flow. Net length may be minimized as well.

Figure 2:
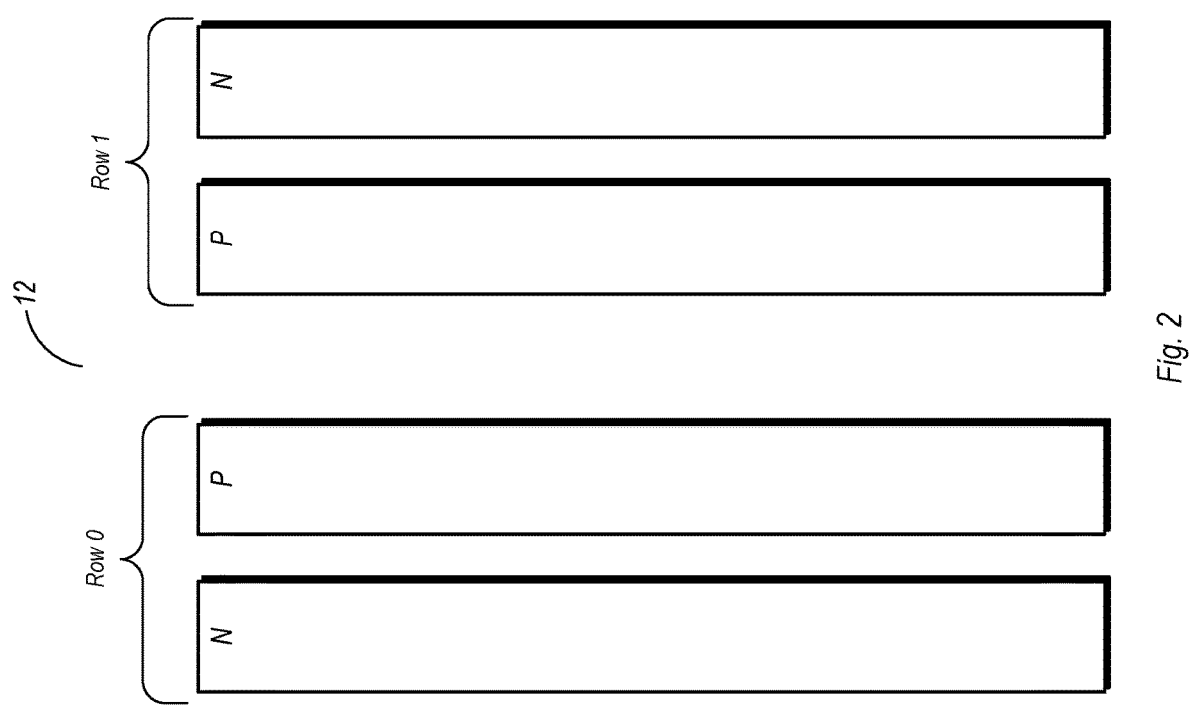
FIG. 2 is an illustration of the rows of P-type and N-type material to which transistors are to be placed by one embodiment of a digital circuit layout tool.

Groups of transistors may be placed into rows that include P-type material and N-type material. FIG. 2 is an illustration of the rows of P-type and N-type material to which transistors are to be placed by one embodiment of a digital circuit layout tool. In the embodiment shown, rows 12 includes two rows, row 0 and row 1. Each of the rows can be further subdivided into a sub-row of N-type material and a sub-row of P-type material. Each of the selected groups may be placed into one of the two rows shown here for one embodiment of the digital circuit layout tool. After the transistor groupings have been determined, a user may select which of the rows in which the groups are to be placed. The digital circuit layout tool may then automatically place the transistors of the selected groups in appropriate rows, and may also generate interconnections. NMOS transistors may be placed in a sub-row of N-type material, while PMOS transistor may be placed in a row of P-type material.

Figure 3:
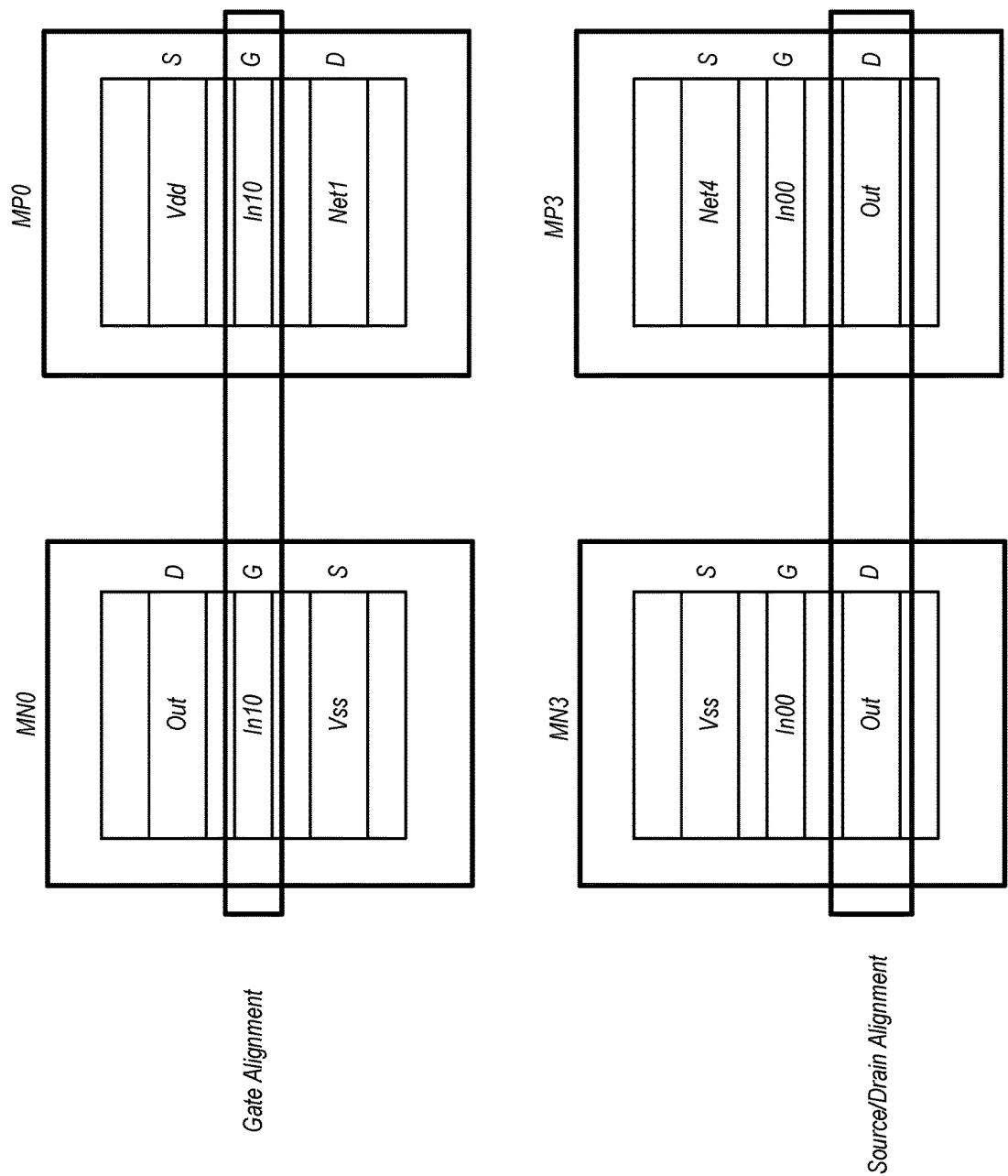
FIG. 3 is an illustration of various aspects of the gate alignment and source-drain alignment of transistors performed by one embodiment of a digital circuit layout tool.

In placing the transistors of a grouping into selected rows, the digital circuit layout tool may perform certain optimizations. These optimizations include gate alignment and source/drain alignment, examples of which are shown in FIG. 3. In the upper portion of FIG. 3, and using the schematic of FIG. 1, transistors MN0 and MP0 are placed in respective sub-rows such that their respective gate terminals are aligned with one another. Both of these transistors are coupled to the same 'In10' node and thus receive the same input signal. Placement of these transistors with their respective gate terminals aligned with one another thus allows a minimization of the length of the net in the space between the two while simplifying the routing of these interconnections.

In the lower portion of FIG. 3, transistors MN4 and MP5 are arranged such that their respective drains are aligned with one another. The drain terminals of both of these devices are coupled to the 'Out' node, and thus alignment of the two may thereby minimize the length of the net in the space between these two devices, in addition to the resulting simplification of routing.

Figure 4:
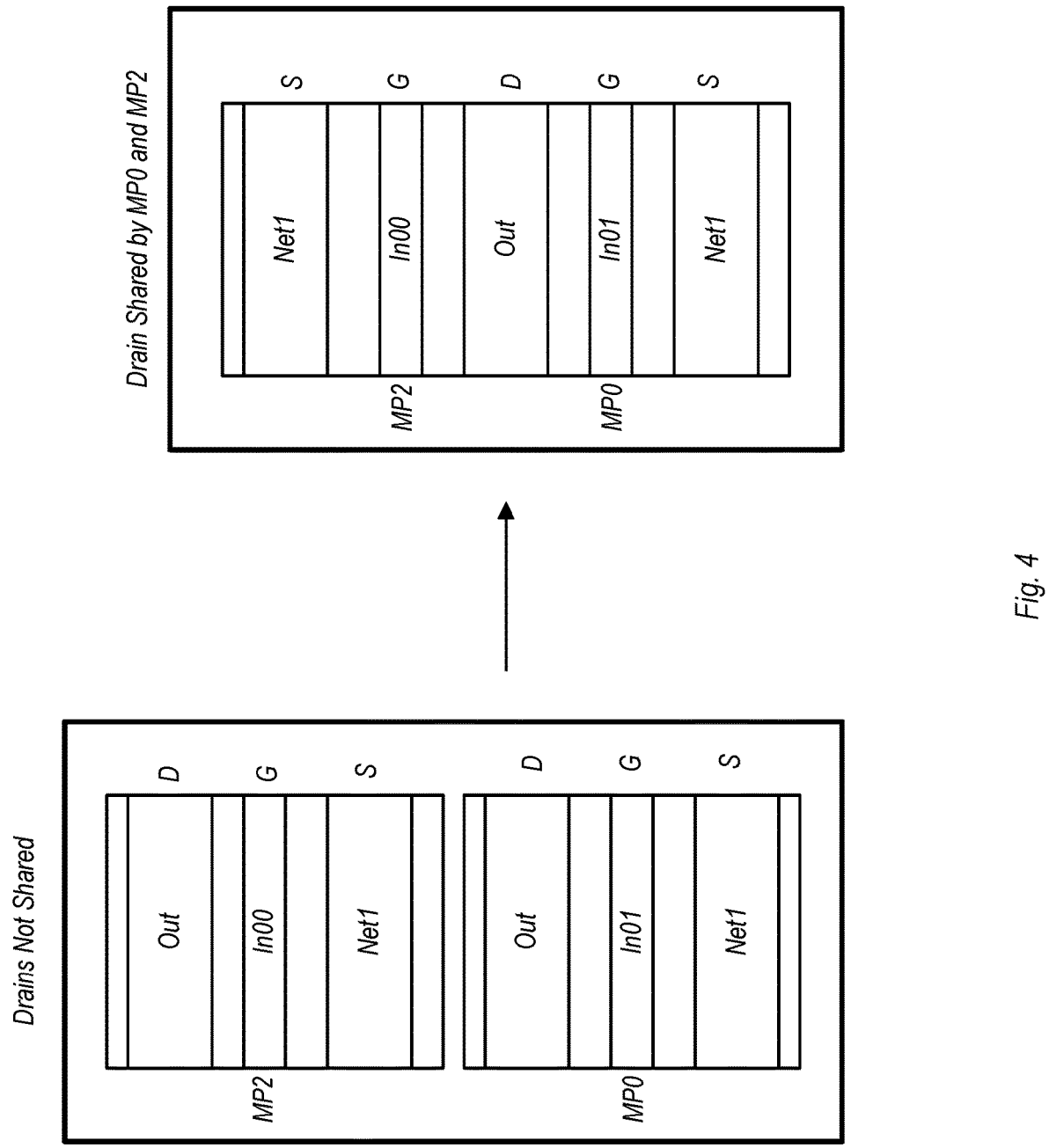
FIG. 4 is a drawing illustrating the source-drain sharing performed by one embodiment of a digital circuit layout tool.

Another optimization that may be automatically performed by the digital circuit layout tool is source-drain sharing, as illustrated in FIG. 4. On the left hand side of the drawing, the respective drain terminals of MP2 and MP0 are not shared. On the right hand side of the drawing, a drain terminal (on the 'Out' node) is shared by both MP0 and MP2. The sharing of the drain terminals is accomplished in by flipping the orientation of MP2 and making its drain terminal the same as that of transistor MP0. This allows more efficient use of space in generating the physical layout of the digital circuit. At minimum, the space consumed by at least one drain terminal and the space between transistors is saved. The digital circuit layout tool as disclosed herein may automatically perform drain sharing in the placement of transistors in situations where such an opportunity exists, such as that depicted in FIG. 4.

Figure 5:
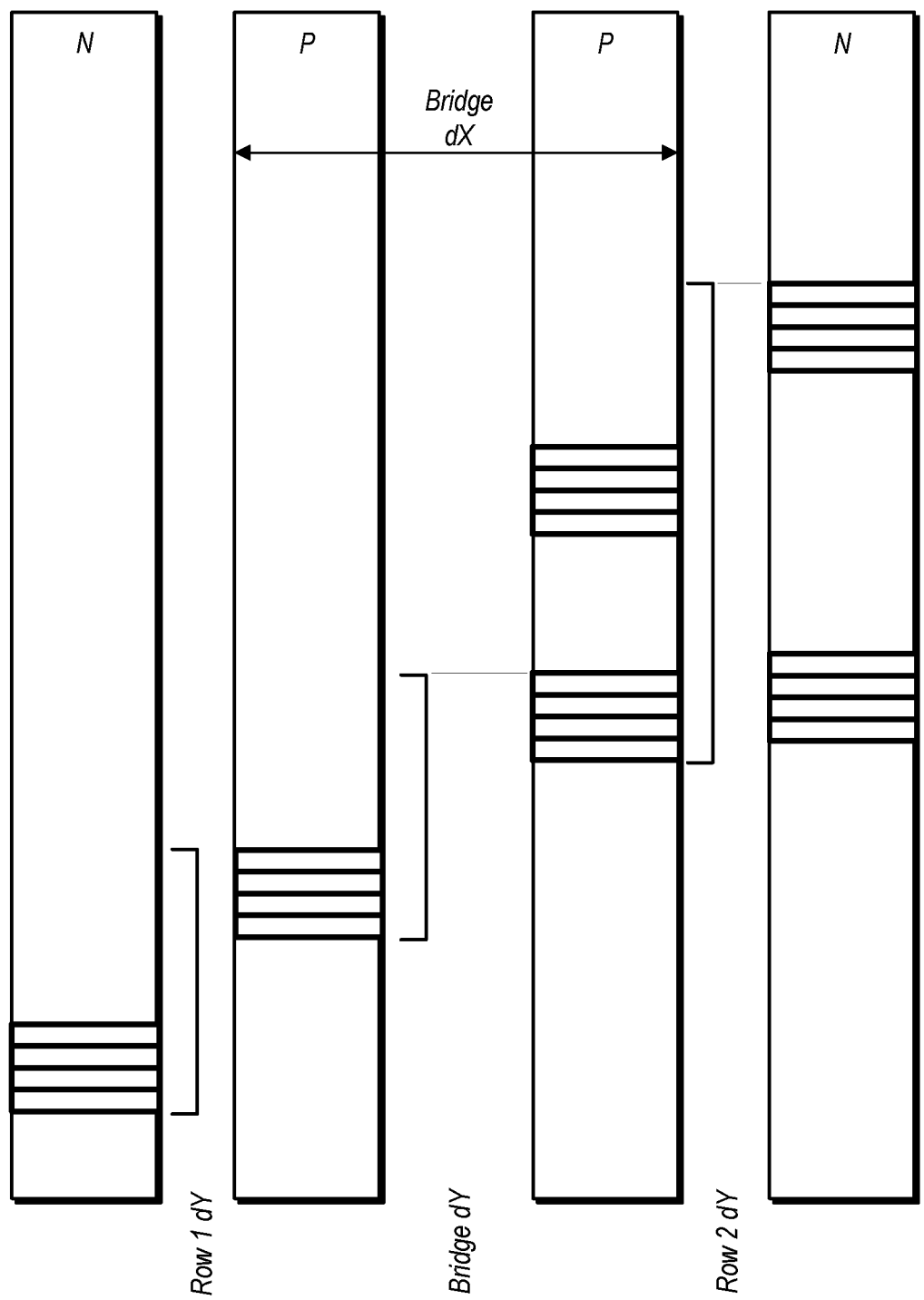
FIG. 5 is a drawing illustrating the minimization of net length performed by one embodiment of a digital circuit layout tool.

FIG. 5 is a drawing illustrating the minimization of net length performed by one embodiment of a digital circuit layout tool. This is another optimization that may be performed by various embodiments of the digital circuit layout tool. When connections are required between one row or another, or one sub-row and another sub-row, the digital circuit layout tool may attempt to place transistors in respective sub-rows so as to minimize length of interconnections with transistors in adjacent sub-rows. This, as with the other optimizations discussed above, may simplify routing, reduce the length of interconnections, and may also result in faster signals speeds.

Figure 6:
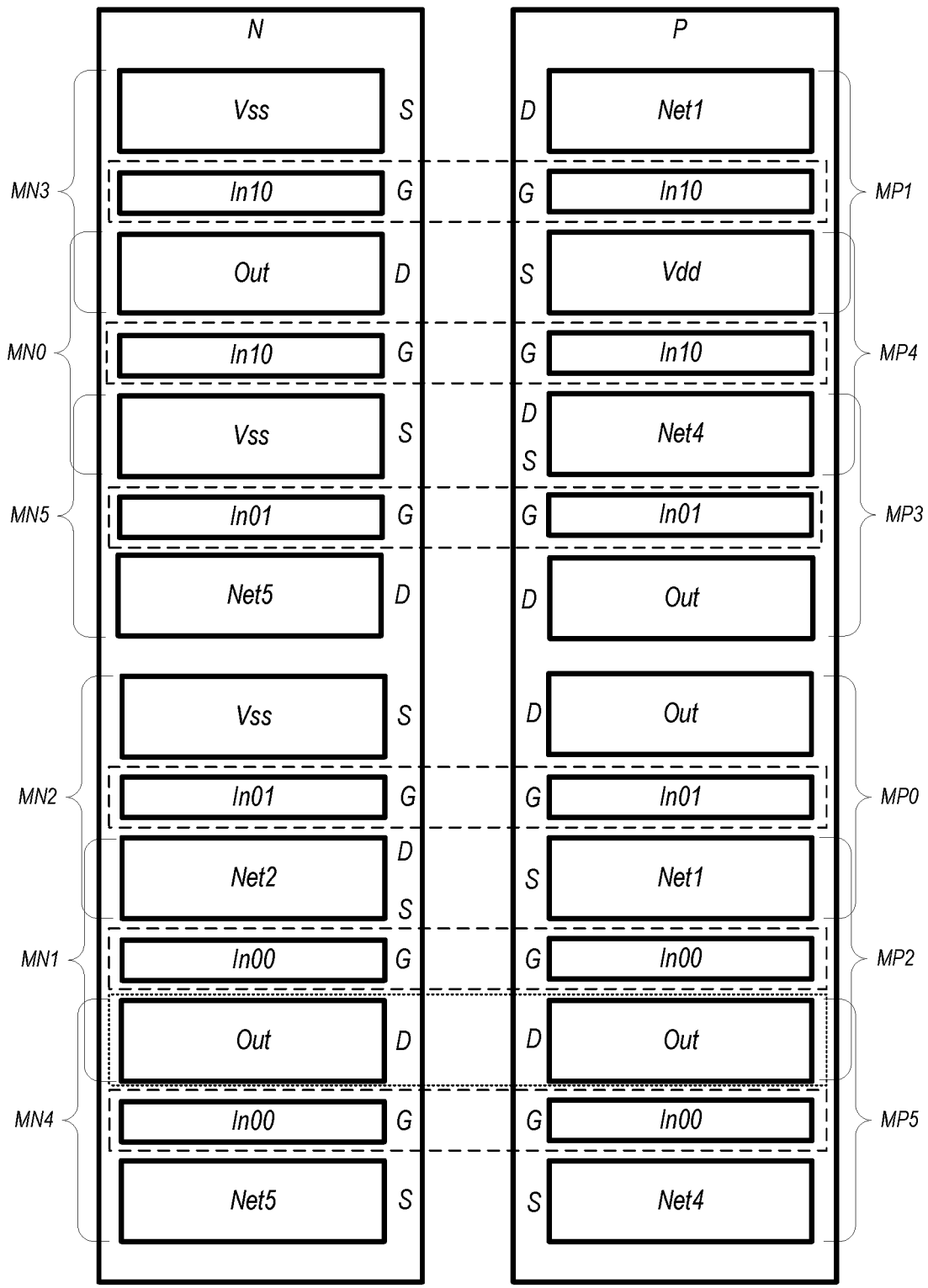
FIG. 6 is a drawing illustrating an exemplary layout of the circuit shown in FIG. 1 in accordance with one embodiment of a digital circuit layout tool.

FIG. 6 is a diagram illustrating an exemplary layout of the circuit of FIG. 1, in accordance with one embodiment of a digital circuit layout tool. It is noted that this exemplary layout is but one of many possible layouts that may be achieved using the digital circuit layout tool discussed herein. Other layouts are possible and contemplated for the same circuit and based on the same schematic. The layouts may depend on factors such as selected transistor groupings, desired optimizations, number of rows selected in which to place the various groups, and so on.

For the sake of simplicity, the interconnections are not shown in FIG. 6. However, for terminals coupled to common nodes irrespective of whether they are shared or aligned, it is understood that these nodes are coupled to a common interconnection in the final physical layout.

In the embodiment shown, the various transistors of circuit 10 are arranged in a single row (two sub-rows) based on a selection of two groups. Since transistors of both groups are implemented in the same row, some re-arranging of transistors within groups has been performed to achieve some of the optimizations discussed above.

One optimization that is achieved by the exemplary layout is gate alignment. For circuit 10, there are a total of twelve transistors. The circuit has three inputs, 'In00', 'In01', and 'In10'. For each input, there are four transistors (two pull-up, two pull-down) that receive the same on respective gate terminals. Thus, the schematic of FIG. 1 provides an opportunity for gate sharing for six pairs of transistors, with each pair including one NMOS transistor and one PMOS transistor. In this particular example, the following pairs of transistors are gate-aligned: MN3-MP1, MN0-MP4, MN5-MP3, MN2-MP0, MN1-MP2, and MN4-MP5. Since the gates are aligned for each of these transistor pairs, routing of interconnections may be simplified. In particular, the interconnection between respective gate terminals of each pair may be a single, straight wire/interconnection.

Another optimization achieved in this exemplary layout is drain sharing and source sharing. This is achieved by placing and orienting transistors of the same type (NMOS or PMOS) adjacent to one another such that commonly shared circuit nets are coupled to terminals of two different transistors. In the illustrated example, transistors MN3 and MN0 share a drain terminal on the 'Out' node. Transistors MN0 and MN5 share a source terminal on the 'Vss' node. Transistors MP4 and MP1 both share a source terminal coupled to the 'Vdd' node. Transistors MP0 and MP2 share a source terminal coupled to 'Net1'. Transistors MP2 and MP5 share a drain terminal coupled to the 'Out' node. Transistors MN4 and MN1 also share a common drain terminal coupled to the 'Out' node.

Source-drain sharing is another optimization that is achieved in the exemplary layout of FIG. 6. This occurs when the source of one device shares a common net/node with the drain of another device. In this particular example, the source terminal of transistor MP3 is shared with the drain terminal of MP4 on node 'Net4'. Similarly, the source terminal of MN1 is shared with the drain terminal of MN2 at 'Net2'.

In one case of the present example, the drains of four separate devices are aligned, each of which is coupled to the 'Out' node. As noted above, transistors MN1 and MN4 share a drain terminal coupled to the 'Out' node, as do transistors MP2 and MP5. Furthermore, the common drain terminal of the two NMOS devices, MN1 and MN4, is aligned with the common drain terminal of PMOS devices, MP2 and MP5. Thus, not only is there gate alignment between MN1 and MP2 ('In00') and MN4 and MP4 (also 'In00'), but there is also drain alignment between these four devices. This further simplifies the routing of interconnections.

It is noted that in this particular example, gate alignment is given precedence over source/drain alignment and source/drain sharing. Thus, in some instances, other terminals that share common nodes (e.g., the drain terminals of MN3 and MP3, both coupled to 'Out') are not aligned. Similarly, the drain terminals of MP3 and MP0 (also both coupled to 'Out') are not shared in order to allow the respective gate terminals of MP0 and MN2 to be aligned with one another. It is noted that a user of the digital circuit layout tool could prioritize sharing of source and/or drain terminals coupled to a common node and/or alignment of source and/or terminals coupled to a common node. Furthermore a use of the digital circuit layout tool may perform multiple runs of the design with different priorities in terms of sharing and/or alignment in order to arrive at a final physical layout plan for the digital circuit.

Figure 7:
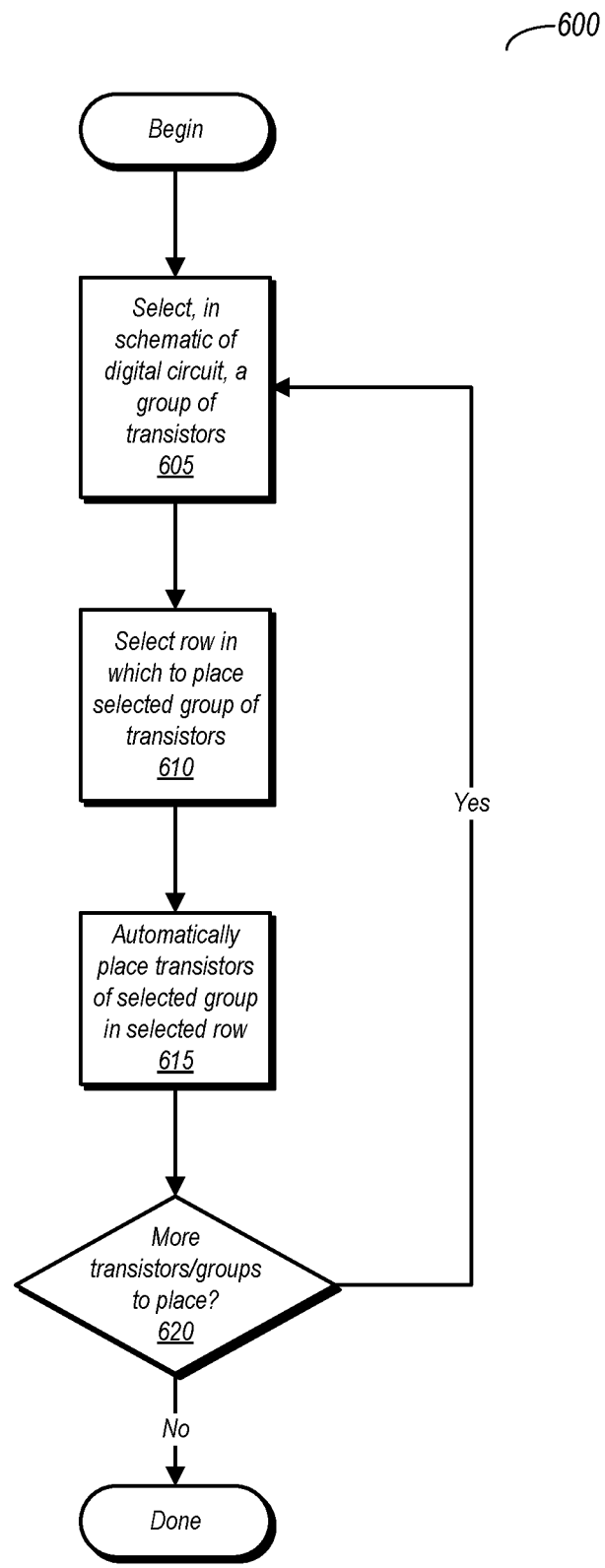
FIG. 7 is a flow diagram illustrating one embodiment of a method for performing a layout of a digital circuit.

FIG. 7 is a flow diagram illustrating one embodiment of a method for performing a layout of a digital circuit. Method 600 may be performed using various embodiments of the digital circuit layout tool discussed herein. Furthermore, method 600 may be used to perform a physical layout of a wide variety of digital circuits using the digital circuit layout tool as disclosed. As noted above, the digital circuit layout tool as disclosed herein may be schematic-driven. Accordingly, using various embodiments of the digital circuit layout tool, a designer can commence generation of a physical layout using the schematic in the absence of any other layout plans.

Method 600 begins with a user selecting, in a schematic of a digital circuit, a group of transistors (block 605). The transistors may be selected by, e.g., highlighting the transistors on the display upon which the schematic is presented. Alternatively, a user may select transistors from the schematic e.g., by inputting text based on viewing the schematic, or by another select operation.

The method further includes selecting a row in which to place selected group of transistors (block 610). In one embodiment (and in accordance with what is illustrated in the example of FIG. 2), a user may select one of the available rows (of which there are two in the example of FIG. 2). Each row includes a sub-row for NMOS transistors and a sub-row for PMOS transistors. Using the example of FIG. 2, a user can select one or both rows for the placement of transistors, dependent in part on the groupings selected.

After at least one grouping and a corresponding row have been selected, the digital circuit layout tool may automatically place transistors of the selected group in the selected row (block 615). Placement of the transistors may include the routing of interconnections there between. The placement may also include performing various optimizations, such as those discussed above, e.g., gate alignment, source/drain sharing, and so forth.

If there are more groups to be place (block 620, yes), method 600 may return to block 605 and repeat from there. As additional groups of transistors are selected and designated for a given row, the digital circuit layout tool may continue to perform the automatic placement and routing of interconnections, and may also continue to perform the various optimizations. In some instances, transistors that were previously placed in a specific row may be moved to different locations in order to optimize their placement relative to the other transistors.

If all transistors depicted in the schematic of the digital circuit have been grouped and placed (block 620, yes), then method 600 may be complete. It is noted that for various embodiments, the method is not confined to the order of the steps shown here. For example, a user could perform groupings for all transistors, place all groups in selected rows, with the digital circuit layout tool performing the automatic placement, interconnection routing, and optimizations thereafter.

Figure 8:
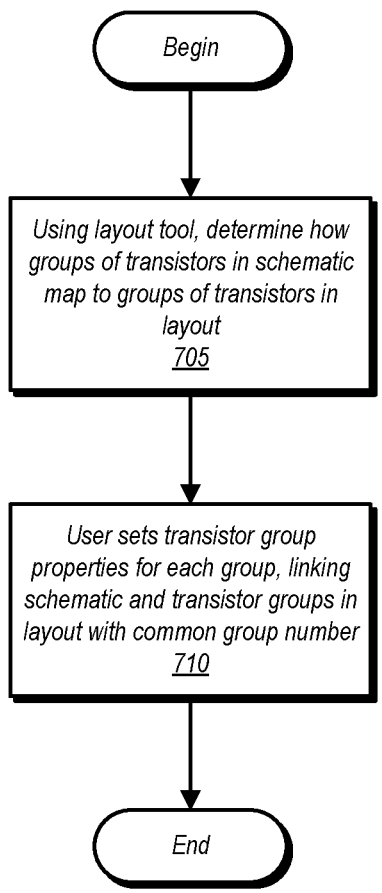
FIG. 8 is a flow diagram illustrating one embodiment of a method for performing transistor group properties from the schematic of a digital circuit.

In addition to being useful for performing an initial layout of a digital circuit, the digital circuit layout tool as disclosed herein may also be useful for performing updates and engineering changes per engineering change orders (ECOs). In such cases, the user may begin with both the schematic of the digital circuit, as well as a previously generated layout. In order to understand the layout better, the user may utilize the schematic and the layout, as presented in a GUI, to determine mappings between transistors in the schematic and in the layout. FIG. 8 is a flow diagram illustrating one embodiment of a method for beginning the process of updating a layout using both the schematic and a previously generated layout.

Method 700 as shown in FIG. 8 may be performed by various embodiments of the digital circuit layout tool. Method 700 begins with the determination of mappings of groups of transistors in the schematic of the digital circuit to those as shown in the layout (block 705). This may be performed by, e.g., selecting a transistor or a group of transistors on the displayed schematic, with the result being the corresponding transistors in the layout being highlighted on the displayed layout plan. Alternatively, a user could, e.g., select a transistor on the displayed layout plan, with the corresponding transistor and its group being highlighted on the displayed schematic.

Method 700 continues with a user setting transistor group properties for transistors in each group, linking the schematic and transistor groups of the layout with a common group number (block 710). This may include assigning or otherwise indicating (if previously assigned) a group number for transistor grouping as both displayed on the schematic and in the layout plan. Setting the group properties may include changing properties for transistors within a group. Virtually any property of the transistor may be changes. Examples of such properties include gate width, oxide thickness, threshold voltages, and so on. It is not necessary that properties for all transistors in a group be changed, nor is it necessary that any transistors in a given group be changed in this step. Generally speaking, a user may pick and choose which transistors for which properties are to be changed. However, a user can apply changes to all transistors in a group if desired, particularly in instances where each transistor in the group has identical properties.

In changing the properties of one or more transistors in a group, the digital circuit layout tool may automatically update various factors such as spacing between transistors, the routing of interconnections, and so on.

Another aspect of the digital circuit layout tool is the ability to create libraries, or databases of previously designed digital circuit that have undergone the layout process. In the design of integrated circuits, commonly used digital circuits may be re-used in the design of larger circuits (e.g., arithmetic circuits, various logic circuits, and so on). Rather than re-designing these circuits for each new project, an integrated circuit designer may utilize previously designed circuits from a library/database. The digital circuit layout tool as described herein may be useful in both creation of entries for such a database, as well as using such entries in the design of larger circuits. The entries created by the digital circuit layout tool may include both a schematic and a generated physical layout, along with other information such as device properties, operating parameters (e.g., frequency limits, voltage limits), and so on. Drawing on these libraries, a user may create larger, more complex circuits for which a physical layout can be rapidly generated. Furthermore, in using a particular entry from such a library, a user may update various properties in order to adapt the corresponding circuit to a particular application. The user may also save any updated circuit as a new library entry.

Figure 9:
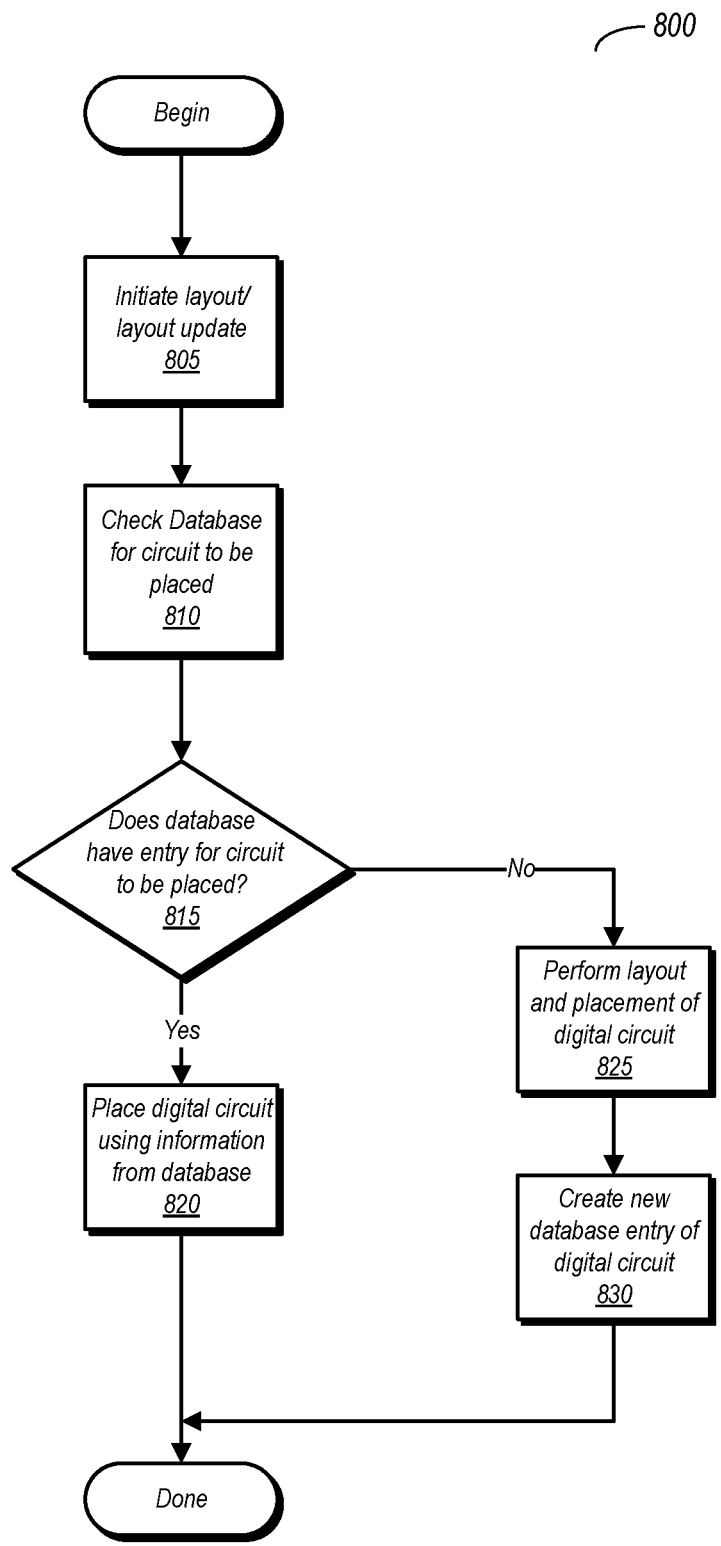
FIG. 9 is a flow diagram illustrating one embodiment of a method for performing a digital circuit layout using a database of digital circuits.

FIG. 9 is a flow diagram illustrating one embodiment of a method for performing a digital circuit layout using a library/database of digital circuits. Method 800 as shown herein may be performed by various embodiments of the digital circuit layout tool, and may incorporate any of the various features discussed herein.

Method 800 begins with the initiation of a layout process or a layout update process (block 805). This may include performing the various processes of methods 600 and 700 as discussed above. The method further includes checking a database for an entry corresponding to the circuit to be placed (block 810). For example, if the user is placing within a layout design a circuit that corresponds to a particular type of logic gate or sequential circuit, the digital circuit layout tool may check the database to determine if a corresponding entry exists. If an entry is found in the database (block 815, yes), placement of the corresponding circuit within the larger circuit may be automatically performed using information from the entry in the database (block 820). The circuit obtained from the database entries may incorporate all of the properties specified therein, e.g., device sizes, threshold voltages, frequency limits, etc.

If an entry for the circuit for which placement is to be performed is not found in the database (block 815, no), then the digital circuit layout tool may perform layout of the digital circuit and placement within the larger circuit (block 825). The layout of the digital circuit may be performed by the digital circuit layout tool in accordance with the discussion above, and may include all facets thereof, such as placement within selected rows, optimizations, and the routing of interconnections. Thereafter, the digital circuit may then be placed within the larger digital circuit. Additionally, for the new digital circuit, a data base entry may be created and recorded in the database (block 830).

Figure 10:
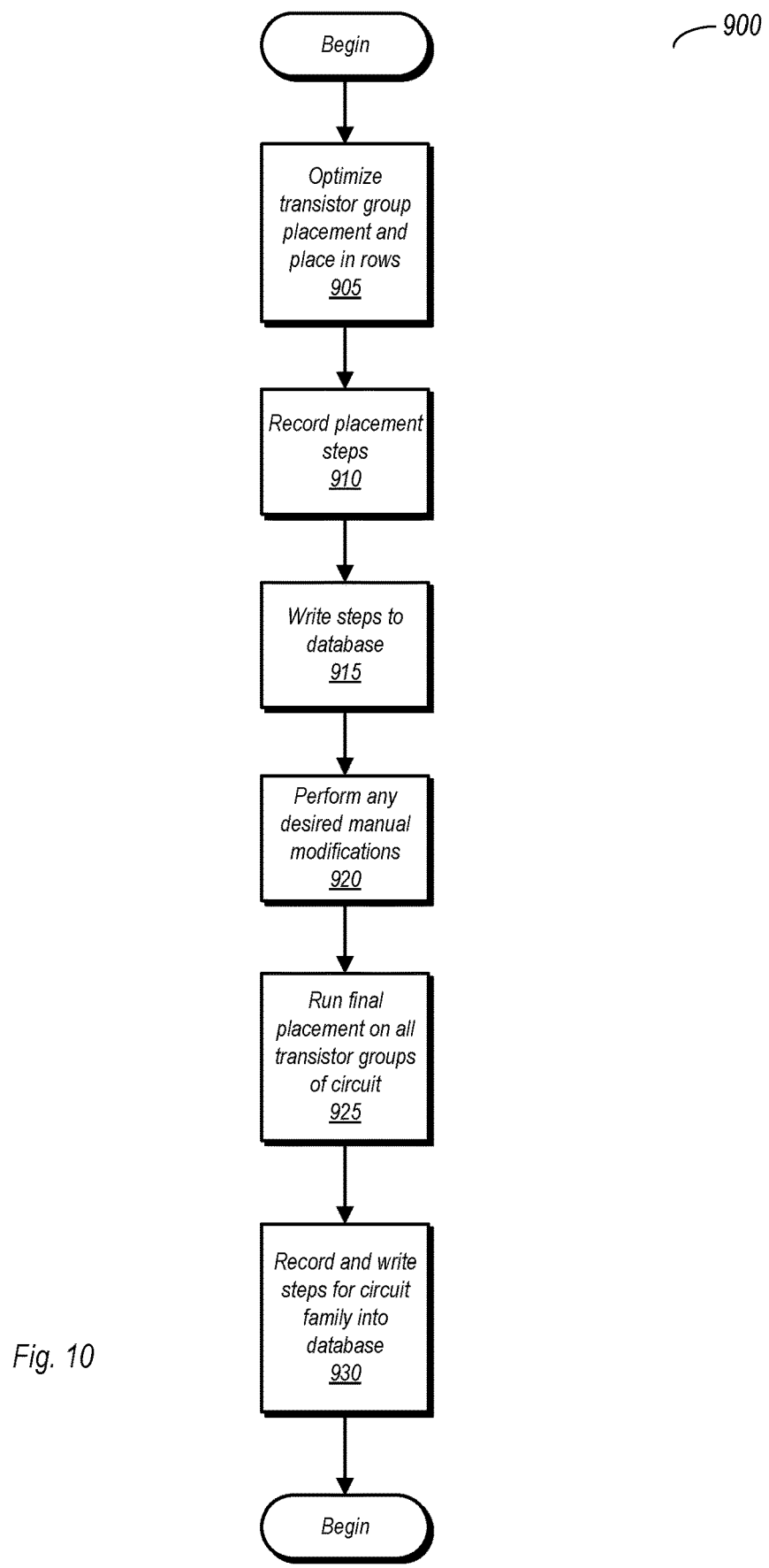
FIG. 10 is a flow diagram illustrating one embodiment of a method for generating a database entry for performing physical layout of a digital circuit.

FIG. 10 is a flow diagram illustrating one embodiment of a method for generating a database entry for performing physical layout of a digital circuit. In particular, method 900 is directed to the creation of a new database entry in accordance with blocks 825 and 830 of method 800 discussed above.

Method 900 begins with the optimization and placement of transistor groups in rows (block 905). This occurs subsequent to a user selecting and designating the groups from a schematic of the digital circuit and selection of rows in which the groups are to be placed. As the digital circuit layout tool performs placement of the transistors and the various optimizations, various steps performed are recorded (block 910). During the recording, or upon completion thereof, the performed steps are written into a new database entry (block 915).

After the initial steps have been written to the new database entry, a user of the digital circuit layout tool may perform manual modifications to the corresponding digital circuit (block 920). Such modifications may be, e.g., the changing of feature sizes of one or more devices, adjustment of any pertinent electrical parameters, and so on. After completion of the manual adjustments, another final placement run may be conducted (block 925). This may include adjusting the spacing between transistors, re-running optimizations, re-routing interconnections where necessary, and so on. Once the final placement and layout of the digital circuit has been settled, the full set of steps for generating the layout of the circuit may be recorded and written into the database (block 930).

Figure 11:
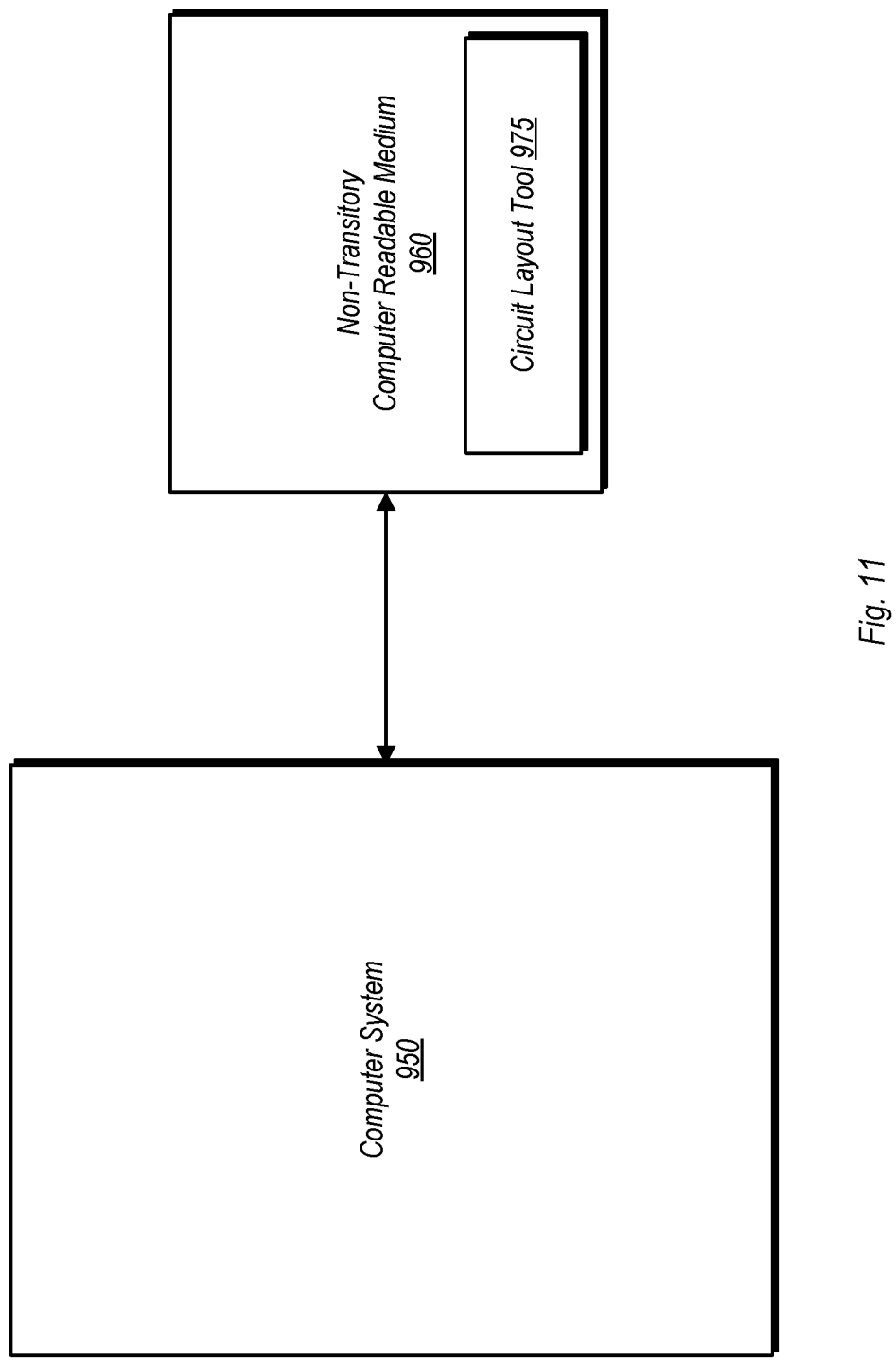
FIG. 11 is a block diagram of an embodiment of computer system and a computer readable medium storing instructions for implementing a digital circuit layout too.

FIG. 11 is a block diagram of one embodiment of a computer system and a non-transitory computer readable medium. Computer system 950 in the embodiment may be one of a number of different types of computer systems that may execute instructions of the digital circuit layout tool. Such computer systems include, but are not limited to, desktop computers/workstations, laptop computers, as well as tablets and mobile devices.

Computer system 950 may include, or may be coupled to, non-transitory computer readable medium 960. This computer readable medium may be one of a number of different types of non-transitory storage, including flash memory, CD-ROM, various types of RAM/SRAM, hard disk/bulk storage, solid state drive (SSD), or any other suitable storage medium that may be utilized by a computer system.

Stored on computer readable medium in the embodiment shown is digital circuit layout tool 975, which may include instructions executable by computer system 805 to perform the various tasks discussed above. Additionally, the digital circuit layout tool may include one or more databases. These databases may include information on various components, materials used in the actual physical implementation of analog circuits, and so on. These databases may include interfaces that allow modification by users of the digital circuit layout tool. For example, a user may modify a component database to add new components thereto. The digital circuit layout tool 975 may also be operable to perform file storage, such as storage of data pertaining to physical layouts of analog circuits, and information for manufacturing the same.

Although not explicitly shown, computer system 950 may include, or may be coupled to, one or more output devices. Such output devices may include a display terminal, a portion of a network card configured for transmitting information, a storage medium that is both writeable and portable, or a printer, among other possible examples. Through such an output device, computer system 950 may output a physical layout plan for an analog circuit as generated by the digital circuit layout tool 975. Such a plan may be in one of a number of different file formats, and may include multiple files, at least some of which may be different formats than others. The layout plan for a given analog circuit as generated by digital circuit layout tool 975 and output from computer system 805 may be useable to manufacture the analog circuit. For example, the layout plan may be receivable by equipment used for manufacturing digital and/or mixed signal integrated circuits or generating masks for the same. Using files that include the layout plan, integrated circuit masks may be generated and the circuit may be manufactured. In general, computer system 950 may output any type of information in any type of format that is usable to manufacture a layout of an analog circuit generated by the digital circuit layout tool, as well as understanding the layout of the same and the construction of the circuit in terms of components and materials.

Numerous variations and modifications will become apparent to those skilled in the art once the above disclosure is fully appreciated. It is intended that the following claims be interpreted to embrace all such variations and modifications.

What is claimed is:

1. A method comprising:
    selecting, in a schematic of a first digital circuit displayed in a digital circuit layout tool executed on a computer system, a group of transistors;
    selecting one of a plurality of rows in a physical layout in which the group of transistors is to be placed, wherein each of the plurality of rows includes a first sub-row of N-type material and a second sub-row of P-type material, the first and second sub-rows being adjacent to one another, wherein the plurality of rows are arranged such that a sub-row of one type of material of one of the plurality of rows in the physical layout is arranged adjacent to a sub-row of a same type of material in another one of the plurality of rows;
    automatically placing transistors of the group of transistors, using the digital circuit layout tool, in the one of the plurality of rows of the physical layout; and
    repeating selecting of additional groups of transistors, selecting from the plurality of rows, and automatically placing until all transistors of the first digital circuit depicted as in the schematic have been placed for use in generating a physical layout plan for the first digital circuit.

2. The method as recited in claim 1, further comprising:
    recording a sequence of steps conducted in generating the physical layout plan for the first digital circuit; and
    storing, in a database, the sequence of steps conducted in generating the physical layout plan for the first digital circuit.

3. The method as recited in claim 2, further comprising, generating a library for a plurality of digital circuits including the first digital circuit, wherein generating the library includes:
    recording respective sequences of steps conducted in generating respective physical layout plans for each of the plurality of digital circuits; and
    storing, in the database, the respective sequences of steps for each of the plurality of digital circuits.

4. The method as recited in claim 3, further comprising:
    determining if a respective sequence of steps is stored in the database for a second digital circuit; and
    responsive to determining that the respective sequence of steps is stored in the database for a second digital circuit, automatically generating a physical layout plan for the second digital circuit.

5. The method as recited in claim 1, wherein automatically placing transistors comprises performing source-drain alignment of two or more of the transistors.

6. The method as recited in claim 1, wherein automatically placing each transistor includes minimizing spacing between the transistors.

7. The method as recited in claim 1, wherein automatically placing each transistors includes performing gate alignment of two or more transistors.

8. The method as recited in claim 1, wherein each row includes a sub-row of N-type material and a sub-row of P-type material.

9. A non-transitory computer readable medium storing instructions thereon that implement a digital circuit layout tool, wherein the instructions of the digital circuit layout tool, when executed by a computer system, cause the computer system to:
    select, in a schematic of a first digital circuit and based on user input to the digital circuit layout tool, a group of transistors;
    select, based on user input to the digital circuit layout tool, one of a plurality of rows in a physical layout in which the group of transistors is to be placed, wherein each row includes a sub-row of N-type material and a sub-row of P-type material, wherein the plurality of rows are arranged such that a sub-row of one type of material of one of the plurality of rows in the physical layout is arranged adjacent to a sub-row of a same type of material in another one of the plurality of rows;

automatically place transistors of the group of transistors, using the digital circuit layout tool, in the one of the plurality of rows of the physical layout; and repeat selecting of additional groups of transistors, selecting from the plurality of rows, and automatically placing until all transistors of the first digital circuit depicted in the schematic have been placed for use in generating a physical layout plan for the first digital circuit.

10. The computer readable medium as recited in claim 9, wherein instructions to automatically place transistors of the group of transistors include instructions that, when executed on the computer system, perform source-drain alignment of two or more of the transistors.

11. The computer readable medium as recited in claim 9, wherein instructions to automatically place transistors of the group of transistors include instructions that, when executed on the computer system, perform gate alignment of two or more transistors.

12. The computer readable medium as recited in claim 9, wherein instructions to automatically place transistors of the group of transistors include instructions that, when executed on the computer system, minimize spacing between transistors.

13. The computer readable medium as recited in claim 9, wherein the digital circuit layout tool includes further instructions that, when executed by the computer system cause the computer system to generate a library for a plurality of digital circuits including the first digital circuit, wherein generating the library includes:

recording respective sequences of steps conducted in generating respective physical layout plans for each of the plurality of digital circuits; and storing, in the library, the respective sequences of steps for each of the plurality of digital circuits.

14. The computer readable medium as recited in claim 13, wherein the digital circuit layout tool includes further instructions that, when executed by the computer system, cause the computer system to:

determine if a respective sequence of steps is stored in the library for a second digital circuit; and responsive to determining that the respective sequence of steps is stored in the library for a second digital circuit, automatically generate a physical layout plan for the second digital circuit.

15. A computer system comprising:

a non-transitory storage medium storing thereon a digital circuit layout program, wherein the digital circuit layout program includes instructions that, when executed by a processor of the computer system, cause the computer system to:

select, in a schematic of a first digital circuit and based on user input to the digital circuit layout program, a group of transistors;

select, based on user input to the digital circuit layout program, one of a plurality of rows in a physical layout in which the group of transistors is to be placed, wherein each row includes a sub-row of N-type material and a sub-row of P-type material, wherein the plurality of rows are arranged such that a sub-row of one type of material of one of the plurality of rows in the physical layout is arranged adjacent to a sub-row of a same type of material in another one of the plurality of rows;

automatically place transistors of the group of transistors, using the digital circuit layout program, in the one of the plurality of rows of the physical layout; and repeat selecting of additional groups of transistors, selecting from the plurality of rows, and automatically placing until all transistors of the first digital circuit depicted in the schematic have been placed for use in generating a physical layout plan for the first digital circuit.

16. The computer system as recited in claim 15, wherein instructions to automatically place transistors of the group of transistors include instructions that, when executed on the computer system, perform source-drain alignment of two or more of the transistors, perform gate alignment of two or more transistors, and minimize spacing between transistors.

17. The computer system as recited in claim 15, wherein the digital circuit layout program includes further instructions that, when executed by the computer system cause the computer system to:

recording a sequence of steps conducted in generating the physical layout plan for the first digital circuit; and storing, in a database, the sequence of steps conducted in generating the physical layout plan for the first digital circuit.

18. The computer system as recited in claim 17, wherein the digital circuit layout program includes further instructions that, when executed by the computer system, cause the computer system to generate a library for a plurality of digital circuits including the first digital circuit, wherein generating the library includes recording respective sequences of steps conducted in generating respective physical layout plans for each of the plurality of digital circuits; and storing, in the database, the respective sequences of steps for each of the plurality of digital circuits.

19. The computer system as recited in claim 18, wherein the digital circuit layout program includes further instructions that, when executed by the computer system, cause the computer system to:

determine if a respective sequence of steps is stored in the database for a second digital circuit; and responsive to determining that the respective sequence of steps is stored in the database for a second digital circuit, automatically generate a physical layout plan for the second digital circuit.

* * * * *